UNITED STATES PATENT OFFICE.

JAMES A. CUTTING, OF BOSTON, MASSACHUSETTS.

IMPROVEMENT IN PHOTOGRAPHIC PICTURES ON GLASS.

Specification forming part of Letters Patent No. 11,267, dated July 11, 1854; Reissue No. 384, dated August 12, 1856.

*To all whom it may concern:*

Be it known that I, JAMES A. CUTTING, of Boston, in the county of Suffolk and State of Massachusetts, have invented new and useful Improvements in Photographic Pictures on Glass; and I do hereby declare the following to be an exact description thereof.

The nature of my improvement consists in the application of a coating of balsam of fir or its equivalent, or varnish, to the side of the glass on which the picture is made, over which coating I place another glass of equal size with the one on which the picture is.

To enable others skilled in the art to make and use my invention, I will proceed to describe the process as follows: After thoroughly cleaning the glass plate of the same size as that on which the picture to be secured is made, and removing all dust from the picture, I hold the glass containing the picture in a horizontal position, with the picture side uppermost, then apply the balsam in a line along one edge of the glass, and, placing one edge of the second glass in close contact with the edge of the first, containing the balsam, press them gradually together toward the opposite edge, causing the balsam to flow by a gentle pressure toward the opposite edge, in this manner excluding all air from between the glasses, then by an even pressure exclude the superabundant balsam.

The advantages of my improvement are that by a mechanical combination of the balsam with the picture it is greatly increased in strength and beauty by imparting an additional brilliancy, and the exhibition of the most minute delineations; and by the application of the second glass, in combination with the balsam, the picture is hermetically sealed, and rendered entirely permanent by being secure from the influence of both air and moisture, and also from injury by dust or other extraneous matter, or acid vapors, or any violence less than would occasion a fracture or destruction of the glass plates. These positive pictures on glass, hermetically sealed, as above described, I denominate "ambrotypes."

I am aware of the previous use of balsam for the cementing of lenses and the securing of microscopic objects and other like purposes, and do not, therefore, extend my claim to any of these uses; but

What I claim as my invention, and desire to secure by Letters Patent, is—

The combination of balsam or its equivalent with positive photographic pictures on glass, and with the additional glass, by which they, with the balsam, are hermetically sealed, as described in the specification, and for the purposes therein set forth, and for no other.

JAMES A. CUTTING.

Witnesses:

JOHN REHN,

M. WRIGHT.